(No Model.)
A. A. STILL.
Tire Upsetter.
No. 243,647.  Patented June 28, 1881.
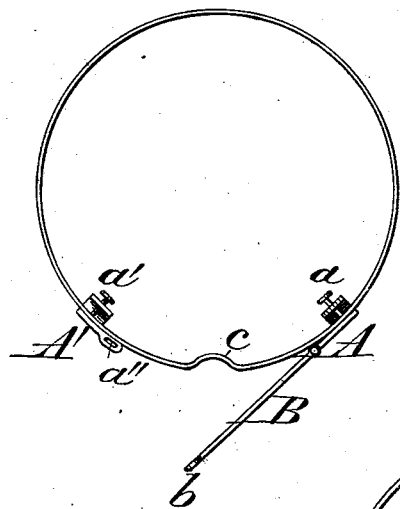
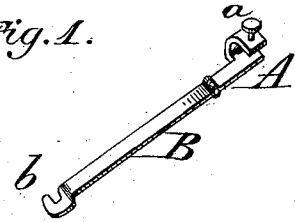
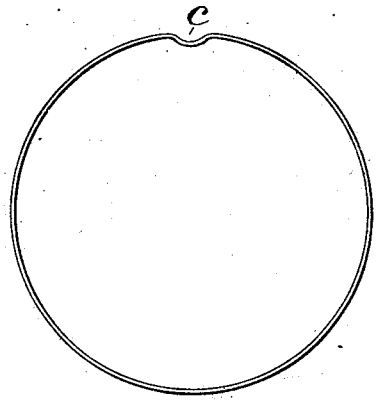
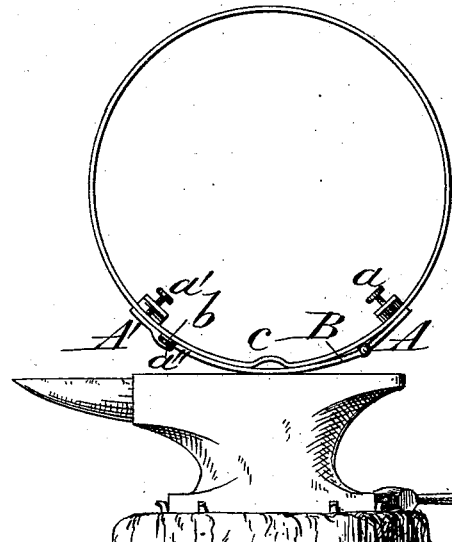
Witnesses:  Inventor:

UNITED STATES PATENT OFFICE.

ABRAM A. STILL, OF LA PANZA, CALIFORNIA.

TIRE-UPSETTER.

SPECIFICATION forming part of Letters Patent No. 243,647, dated June 28, 1881.

Application filed December 4, 1880. (No model.)

*To all whom it may concern:*

Be it known that I, ABRAM A. STILL, a citizen of the United States, residing at La Panza, in the county of San Luis Obispo and State of California, have invented a new and useful Machine or Implement for Upsetting Tires, of which the following is a specification.

The object of my invention is to shorten and upset the tires of wagon or carriage wheels without cutting or welding, and at one heating, after the machine is attached to the tire, as hereinafter more fully described. I attain this object by the mechanism illustrated in the accompanying drawings, in which—

Figure 1 is a view of the parts of the machine or implement. Fig. 2 is a view of the tire as prepared to receive the machine. Fig. 3 is a view of the tire with the parts of the machine attached, prior to being heated. Fig. 4 is a view of the tire with the machine attached and in position, after the tire has been heated and is ready to be set up.

Like letters refer to like parts.

A is a clamp, with a setting-screw, $a$, and a joint connecting it with the bar B, which is provided with a hook, $b$, at its free end, for the purpose of connecting it with a similar clamp, A', having a set-screw, $a'$, and eye $a''$.

In using this device I first ascertain how much the tire needs to be shortened, and then indicate the same thereon by proper marks. The tire is then heated and dented by a blow of the hammer, as shown in Fig. 2. I next adjust the clamps A A', as shown in Fig. 3, so that when they are connected by passing the hook $b$ of the hinged bar B through the eye $a''$ of the clamp A' they will hold the tire firmly until the dent $c$ is hammered down and the tire thus brought to the required length. When putting on the clamps a couple of small dents must be made in the tire at a proper distance apart to receive the points of the set-screws $a$ $a'$, which enables the screws to hold the tire from slipping while the soft metal is being hammered into proper shape, after having been heated and made ready for the final work, as shown in Fig. 4. After the clamps have been properly adjusted the connecting arm or bar B is unhooked and swung back while the tire is being heated at the dent, after which the bar is again swung into connection with the clamp A' and the dent hammered out, as above described.

I am aware that devices for shrinking tires have heretofore been used in which clamps have been arranged on parallel bars connected by screw-rods. This, however, I do not claim; but,

Having thus described my invention, what I claim as new, and desire to secure by Letters Patent, is—

1. In a tire-upsetter, the combination, with a clamp having a set-screw and eye, of a clamp provided with a set-screw and jointed bar or arm having a hooked end, substantially as and for the purpose specified.

2. In a tire-upsetter, the clamp A, having set-screw $a$, and hinged bar B, provided with hook $b$, in combination with the clamp A', having set-screw $a'$ and eye $a''$, substantially as shown and described.

ABRAM A. STILL.

Witnesses:
J. W. STUMP,
E. W. STUMP.